United States Patent [19]

Mogi et al.

[11] Patent Number: 5,416,138

[45] Date of Patent: May 16, 1995

[54] EPOXY RESIN COMPOSITION

[75] Inventors: Naoki Mogi, Utsunomiya; Hiroshi Yasuda, Tochigi, both of Japan

[73] Assignee: Sumitomo Bakelite Company Limited, Tokyo, Japan

[21] Appl. No.: 120,852

[22] Filed: Sep. 15, 1993

Related U.S. Application Data

[63] Continuation-in-part of Ser. No. 949,938, Sep. 24, 1992, abandoned.

[51] Int. Cl.$^6$ .................... C08K 3/36; C08L 61/12; C08L 63/00
[52] U.S. Cl. .................... 523/466; 525/481; 525/501; 525/98; 525/153
[58] Field of Search ................ 523/466; 525/481, 501; 528/98, 153

[56] References Cited

U.S. PATENT DOCUMENTS

| | | | |
|---|---|---|---|
| 3,378,525 | 4/1968 | Sellers | 528/98 |
| 5,001,174 | 3/1991 | Yanagisawa | 523/466 |

FOREIGN PATENT DOCUMENTS

| | | |
|---|---|---|
| 458417 | 11/1991 | European Pat. Off. |
| 39-65116 | 3/1964 | Japan |
| 251419 | 10/1988 | Japan |
| 258829 | 10/1990 | Japan |
| 116954 | 5/1991 | Japan |
| 119049 | 5/1991 | Japan |
| 119051 | 5/1991 | Japan |
| 198314 | 7/1992 | Japan |

OTHER PUBLICATIONS

N. P. Preuss, "Synthetic Resins In Coatings 1965", Noyes Development Corp., Pearl River New York pp. 212–214 (1965).

42nd Electronic Components & Technology Conference May 18–20, 1992, Mogi et al., "Development of High-Reliability Epoxy Molding Compounds for surface-Mount Devices"; pp. 1023–1029.

*Primary Examiner*—John C. Bleutge
*Assistant Examiner*—D. R. Wilson
*Attorney, Agent, or Firm*—Browdy and Neimark

[57] ABSTRACT

An epoxy resin composition used for sealing of semiconductor devices, comprising as essential components:
(A) an epoxy resin containing 50–100% by weight, based on total epoxy resin amount, of an epoxy compound represented by formula (I)

$$\underset{R_2\ \ \ R_6\ \ R_8\ \ \ \ R_4}{\overset{R_1\ \ \ \ R_5\ \ R_7\ \ \ \ R_3}{H_2C\text{—}CHCH_2O\text{—}\bigcirc\text{—}\bigcirc\text{—}OCH_2CH\text{—}CH_2}} \quad (I)$$

wherein $R_1$ to $R_8$, which may be the same or different, are each an atom or group selected from the group consisting of hydrogen atom, halogen atoms and alkyl groups, (B) a phenolic resin curing agent containing 30–100% by weight, based on total phenolic resin curing agent amount, of a phenolic resin curing agent represented by formula (II)

$$\left(\text{OH-phenyl-R}\right)\text{-CH}_2\text{-}\left(\text{OH-phenyl-R}\right)_n\text{-H} \quad (II)$$

wherein R is paraxylylene group or a residual group which is obtained by removing two hydrogen atoms from dicylopentadiene, a terpene, cyclopentane or cyclohexane, and n is an integer of 0 to 4,
(C) an inorganic filler, and
(D) a curing accelerator.

7 Claims, No Drawings

EPOXY RESIN COMPOSITION

This is a CIP application Ser. No. 07/949,938, filed Sep. 24, 1992, which was copending and is now abandoned without prejudice in favor of the present application.

FIELD OF THE INVENTION

The present invention relates to an epoxy resin composition used for sealing of semiconductor devices, which shows excellent soldering stress resistance in surface mounting of said semiconductor devices.

RELATED ART STATEMENT

Electronic parts such as diodes, transistors, integrated circuits and the like have been sealed with a thermosetting resin. In integrated circuits, in particular, there is used, as such a thermosetting resin, an epoxy resin having excellent heat resistance and moisture resistance, obtained by curing an o-cresol novolac epoxy resin with a novolac type phenolic resin.

In recent years, with higher integration of integrated circuits, chips have become larger and surface-mounted packages have been gradually switched from DIP (Dual Inline Package) to small thin flat packages such as SOP (Small Outline Package), SOJ (Small Outline J-leads), PLCC (Plastic Leaded Chip Carrier) and the like.

Thus, large chips are sealed in a small thin package. This, however, produces problems such as generation of cracks caused by stress, reduction in moisture resistance caused by said cracks, and the like.

In the soldering step, in particular, the package is suddenly exposed to high temperatures of 200° C. or above, which invites cracking of the package or separation of sealing resin from chips, which causes reduction in moisture resistance.

Hence, it is desired to develop a resin composition which can be suitably used for sealing of large chips at high reliability.

In order to solve the above-mentioned problems, it was proposed in Japanese Patent Application Kokai (Laid-Open) No. 65116/1989 to use, as an epoxy resin for sealing, an epoxy compound represented by the following formula (I)

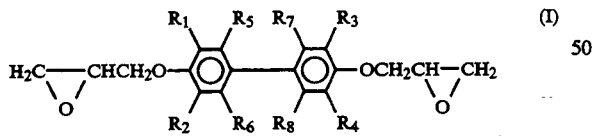

wherein $R_1$ to $R_8$, which may be the same or different, are each an atom or group selected from the group consisting of hydrogen atom, halogen atoms and alkyl groups.

The use of the epoxy compound of formula (I) allowed for a resin system of lower viscosity and resultantly a resin composition containing a larger amount of fused silica powder and consequently having lower thermal expansion, lower moisture absorption and higher soldering stress resistance.

The incorporation of a higher amount of fused silica powder in a resin composition, however, gives a higher modulus. Therefore, further improvement in soldering stress resistance is necessary.

OBJECT AND SUMMARY OF THE INVENTION

The object of the present invention is to provide a resin composition which shows very high cracking resistance when exposed to thermal stress caused by sudden temperature change in soldering step and which further has excellent moisture resistance.

According to the present invention, there is provided an epoxy resin composition used for sealing of semiconductor devices, comprising as essential components:

(A) an epoxy resin containing 50–100% by weight, based on total epoxy resin amount, of a biphenyl type epoxy compound represented by formula (I)

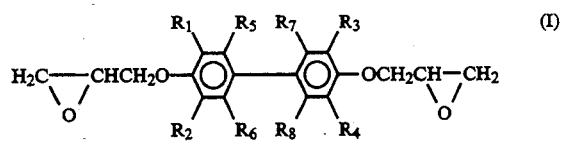

wherein $R_1$ to $R_8$, which may be the same or different, are each an atom or group selected from the group consisting of hydrogen atom, halogen atoms and alkyl groups, (B) a phenolic resin curing agent containing 30–100% by weight, based on total phenolic resin curing agent amount, of a flexible phenolic resin curing agent represented by formula (II)

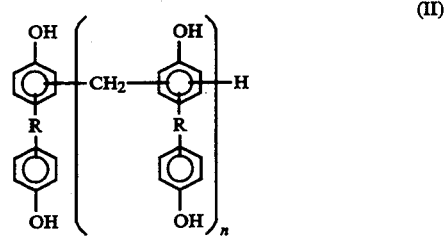

wherein R is paraxylylene group or a residual group obtained by removing two phenol portions from dicyclopentadiene diphenyl or limonenediphenol, which is an addition reaction product of dicyclopentadiene or limonene with phenol, and n is an integer of 0 to 4, (C) an inorganic filler, and (D) a curing accelerator in an amount preferably of 0.1–0.4 wt % based on the total epoxy resin composition, said epoxy resin (A) preferably being used in an amount of 0.8 to 1.2 epoxy equivalents per hydroxyl group equivalent of said phenolic resin curing agent (B). The flexible phenolic resin curing agent of formula (II) may be a single compound wherein n is an integer of 1 to 4, or a mixture of said agents wherein n is an integer of 0 to 4, e.g. a mixture of two or more of such compounds including one wherein n is 0.

The present epoxy resin composition has very high soldering stress resistance as compared with conventional resin compositions used for the same purpose.

DETAILED DESCRIPTION OF THE INVENTION

The biphenyl type epoxy compound represented by formula (I) is a bifunctional epoxy compound having two epoxy groups in the molecule and, as compared with conventional polyfunctional epoxy resins, has a low melt viscosity and excellent fluidity during transfer molding. This allows the present resin composition to contain a large amount of fused silica powder and have low thermal expansion, low water absorption and excellent soldering stress resistance.

The soldering stress resistance of the present resin composition can be made maximum by controlling the amount of the biphenyl type epoxy compound used in the component (A). In order to obtain high soldering stress resistance, it is desirable to use the biphenyl type epoxy compound of formula (I) in an amount of 50% by weight or more, preferably 70% by weight or more based on the total epoxy resin amount in the composition. When the amount is less than 50% by weight, the resulting epoxy resin composition is insufficient in reduction of thermal expansion, reduction of water absorption, and soldering stress resistance. In formula (I), it is preferable that $R_1$ to $R_4$ be each methyl group and $R_5$ to $R_8$ be each hydrogen atom.

When another epoxy resin is used in combination with the biphenyl type epoxy resin of formula (I), the other epoxy resin is an ordinary polymer having epoxy groups. There are cited, for example, bisphenol type epoxy resins, cresol novolac type epoxy resins, phenol novolac type epoxy resins, trifunctional epoxy resins (e.g., triphenolmethane type epoxy resins, and alkyl-modified triphenolmethane type epoxy resins) and triazine nucleus-containing epoxy resins.

The phenolic resin curing agent represented by formula (II) is a flexible phenolic resin curing agent which has, as R in the molecular structure, a relatively flexible structure. This curing agent, as compared with a phenol novolac resin curing agent, etc., can provide the resulting resin composition with lower modulus and higher adhesion with lead frames and semiconductor chips, at about a soldering temperature. Thus, the curing agent of formula (II) is effective in (a) lowering of the stress generated during soldering and (b) prevention of the resulting separation from semiconductor chips, etc.

In order to prepare the phenolic resin curing agent of formula (II), for example when limonene

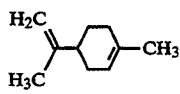

is used as a starting compound, limonene and phenol are first subjected to an addition reaction to produce limonenediphenol,

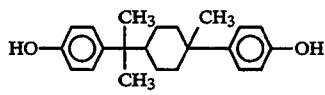

(Limonenediphenol is manufactured and sold by Yasuhara Chemical Co. Ltd. in Japan.) Then, the limonenediphenol is dissolved in a solvent and reacted with formaldehyde in the presence of an acid catalyst to obtain the phenolic resin curing agent of formula (II).

The soldering stress resistance of the present epoxy resin composition can be made maximum by controlling the amount of the phenolic resin curing agent of formula (II) used in the component (B). In order to obtain high soldering stress resistance, it is desirable to use the flexible phenolic resin curing agent of formula (II) in an amount of 30% by weight or more, preferably 50% by weight or more based on the total phenolic resin curing agent amount. When the amount is less than 30% by weight, the resulting resin composition is insufficient in reduction of modulus, adhesion with lead frames, semiconductor chips, etc. and soldering stress resistance.

In formula (II), n must be an integer from 0 to 4. When n is larger than 4, there tend to appear lower fluidity during transfer molding and lower moldability. Also in formula (II), R is preferably a residual group which is obtained by removing two phenol portions from limonenediphenol or dicyclopentadiene diphenol. When another phenolic resin curing agent is used in combination with the flexible phenolic resin curing agent of formula (II), the other phenolic resin curing agent is an ordinary polymer having phenolic hydroxyl groups. There can be cited, for example, phenol novolac resins, cresol novolac resins, dicyclopentadiene-modified phenolic resins, copolymers between dicyclopentadiene-modified phenolic resin and phenol novolac resin and/or cresol novolac resin, and paraxylene-modified phenolic resins.

With regard to blending ratio of the epoxy resin (A) to the phenolic resin curing agent (B), preferably the epoxy resin (A) is used in an amount of 0.8 to 1.2 epoxy equivalents per hydroxyl group equivalent of the phenolic resin curing agent(B). Properties such as humidity resistance tend to deteriorate outside of said range.

As the inorganic filler used in the present epoxy resin composition, there can be cited fused silica powder; spherical silica powder; crystalline silica powder; secondary agglomerated silica powder; porous silica powder; silica powder obtained by grinding secondary agglomerated silica powder or porous silica powder; alumina; etc. Fused silica powder, spherical silica powder and a mixture of the above two silica powders are preferable. The amount of the inorganic filler in the present composition is preferably 70-90% by weight in view of balance between the soldering stress resistance and moldability of the composition.

The curing accelerator used in the present composition can be any material as long as it can accelerate the reaction between the epoxy group of the component (A) and the hydroxyl group of the component (B). There can be widely used those curing accelerators generally used in sealing materials, such as diazabicycloundecene (DBU), triphenylphosphine (TPP), benzyldimethylamine (BDMA), 2-methylimidazole (2-MZ) and the like. These compounds can be used alone or in combination of two or more.

The curing accelerator is preferably used in an amount of 0.1 to 0.4 wt % in the total epoxy resin composition. In an amount less than 0.1 wt %, hardness of the resulting molded product decreases and mold release characteristics tend to deteriorate. In an amount more than 0.4 wt %, the reaction proceeds undesirably fast and fluidity tends to decrease.

The present epoxy resin composition used for sealing comprises, as essential components, an epoxy resin, a curing agent, an inorganic filler and a curing accelerator. The resin composition may further comprise, if necessary, various additives such as silane coupling agent, flame retardant (e.g. brominated epoxy resin, antimony trioxide or hexabromobenzene), coloring agent (e.g., carbon black or red iron oxide), releasing agent (e.g., natural wax or synthetic wax), stress-reducing additive (e.g., silicone oil or rubber), and the like.

In producing the present epoxy resin composition for sealing as a molding material, an epoxy resin, a curing agent, a curing accelerator, a filler and other additives are mixed sufficiently and uniformly using a mixer or the like; then, the mixture is melt kneaded using hot rolls, a kneader or the like; and the kneaded product is cooled and ground. The molding material thus obtained can be used for sealing, coating, insulation, etc. of electronic parts or electric parts.

According to the present invention, there can be obtained an epoxy resin composition having high soldering stress resistance unobtainable with the prior art. Having (a) very high cracking resistance when subjected to thermal stress due to sudden temperature change in soldering step and (b) good moisture resistance, the present epoxy resin composition can be used at high reliability for sealing, coating, insulation, etc. of electronic or electric parts, in particular, highly integrated large chip ICs mounted on surface-mounted packages.

DESCRIPTION OF PREFERRED EMBODIMENTS

The present invention is hereinafter described specifically by way of Examples.

In the Examples, the amount of each component used in compounding is parts by weight.

EXAMPLE 1

The following components of the following proportions were mixed at room temperature using a mixer, then kneaded at 70°-100° C. using a biaxial roll, cooled and ground to obtain a molding material. Epoxy compound of formula (III) (solftening point:

107° C., epoxy equivalent: 190 g/eq)  8.9 parts by weight

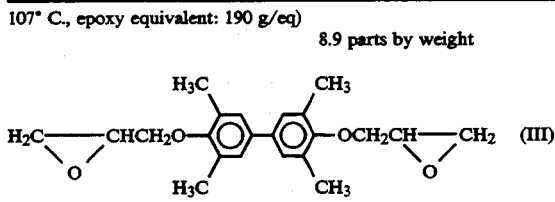

o-Cresol novolac epoxy resin (softening point: 65° C.,
    epoxy equivalent: 200 g/eq):  2.2 parts by weight
Phenolic resin curing agent of formula (IV)
   (softening point: 120° C., hydroxyl
   group equivalent: 170 g/eq)  7.1 parts by weight

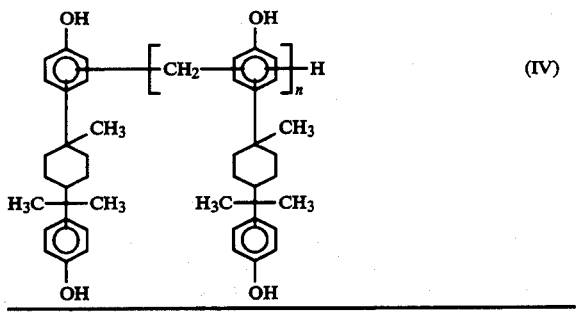

(The above curing agent is a mixture of four compounds, i.e., 34.5 wt % of a compound wherein n=0, 48.3 wt % of a compound wherein n=1, 13.8 wt % of a compound wherein n=2 and 3.4 wt % of a compound wherein n=3.)

| | |
|---|---|
| Phenol novolac resin curing agent (softening point: 105° C., hydroxyl group equivalent: 104 g/eq) | 1.8 parts by weight |
| Fused silica powder | 78.8 parts by weight |
| Triphenylphosphine | 0.2 part by weight |
| Carbon black | 0.5 part by weight |
| Carnauba wax | 0.5 part by weight |

The phenolic resin curing agent of formula (IV) was prepared in the following way: into a reaction vessel there were charged toluene and 648 g (2 moles) of limonenediphenol manufactured by Yasuhara Chemical Co., Ltd., and after stirring and dissolution there were charged 81.1 g (1 mole) of formalin (concentration: 37%) and 6.5 g of para-toluenesulfonic acid, and reflux was carried out for three hours; then water and solvent were removed, and the reaction was completed when the softening point of the reaction product reached 120° C. The resulting reaction product of formula (IV) had a softening point of 120° C. and a hydroxyl group equivalent of 170 g/eq and was a mixture of 34.5 wt % of a compound wherein n=0, 48.3 wt % of a compound wherein n=1, 13.8 wt % of a compound wherein n=2, and 3.4 wt % of a compound wherein n=3.

The molding material was made into tablets and then into chips of 6 mm×6 mm under the conditions of 175° C., 70 kg/cm² and 120 sec. using a low pressure transfer molding machine. 52 p (52-pin) packages were sealed with these chips to obtain devices for solder cracking test. The tablets were also made into chips of 3 mm×6 mm, and 16p SOPs (16-pin Small Outline Packages) were sealed with the chips to obtain devices for solder moisture resistance test.

The devices for test purposes were subjected to the following solder cracking test and solder moisture resistance test. The results are shown in Table 1.

Solder cracking test

The devices for solder cracking test were allowed to stand in an atmosphere of 85° C. and 85% R.H. for 48 hours and 72 hours. Then, the devices were dipped in a solder bath of 260° C. for 10 seconds. Thereafter, the cracks present at the surfaces of the devices were observed using a microscope. The results are expressed by the number of cracked devices/total number.

Solder moisture resistance test

The devices for solder moisture resistance test were allowed to stand in an atmosphere of 85° C. and 85% R.H. for 72 hours. Then, the devices were dipped in a solder bath of 260° C. for 10 seconds. Thereafter, the devices were subjected to a pressure cooker test (125° C. and 100% R.H.), after which circuit opening was examined. The results are expressed by average life (hr).

EXAMPLES 2-5

Epoxy resin compositions were compounded in the respective recipes shown in Table 1, and subjected to the same procedures as in Example 1 to obtain molding materials. Devices for test purposes were prepared using these molding materials and subjected to the solder cracking test and the solder moisture resistance test. The results are shown in Table 1.

Comparative Examples 1–4

Epoxy resin compositions were compounded in the respective recipes shown in Table 1, and subjected to the same procedures as in Example 1 to obtain molding materials. Devices for test purposes were prepared using these molding materials and subjected to the solder cracking test and the solder moisture resistance test. The results are shown in Table 1.

from dicyclopentadiene diphenol or limonenediphenol, which is an addition product of limonene or dicyclopentadiene with phenol, and wherein n is

TABLE I

|  | Example | | | | | Comparative Example | | | |
|---|---|---|---|---|---|---|---|---|---|
| 1 | 2 | 3 | 4 | 5 | 1 | 2 | 3 | 4 |
| Epoxy compound represented by formula (III) | 8.9 | 10.4 | 11.8 | 6.3 | 7.2 | 13.0 | 0 | 3.8 | 0 |
| o-Cresol novolac epoxy resin | 2.2 | 0 | 0 | 4.2 | 4.8 | 0 | 10.7 | 8.9 | 13.2 |
| Phenolic resin curing agent represented by formula (IV) | 7.1 | 9.6 | 4.1 | 9.5 | 4.0 | 0 | 9.3 | 1.5 | 0 |
| Phenol novolac resin curing agent | 1.8 | 0 | 4.1 | 0 | 4.0 | 7.0 | 0 | 5.8 | 6.8 |
| Fused silica powder |  |  |  |  | 78.8 |  |  |  |  |
| Triphenylphosphine |  |  |  |  | 0.2 |  |  |  |  |
| Carbon black |  |  |  |  | 0.5 |  |  |  |  |
| Carnauba wax |  |  |  |  | 0.5 |  |  |  |  |
| Solder cracking test (number of cracked devices/total number) |  |  |  |  |  |  |  |  |  |
| Moisture absorption: 48 hr | 0/16 | 0/16 | 0/16 | 0/16 | 0/16 | 2/16 | 1/16 | 5/16 | 16/16 |
| Moisture absorption: 72 hr | 0/16 | 0/16 | 0/16 | 0/16 | 1/16 | 7/16 | 5/16 | 12/16 | 16/16 |
| Solder moisture resistance test [average life (hr)] | 500< | 500< | 500< | 500< | 500< | 350 | 400 | 300 | 200 |

What is claimed is:

1. An epoxy resin composition used for sealing of semiconductor devices, comprising as essential components:
   (A) an epoxy resin containing 50–100% by weight, based on total epoxy resin amount, of an epoxy compound represented by formula (I)

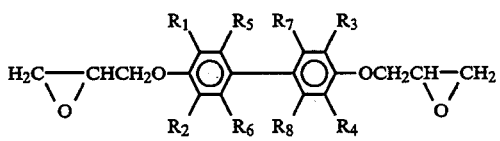

wherein $R_1$ to $R_8$, which may be the same or different, are each an atom or group selected from the group consisting of hydrogen atom, halogen atoms and alkyl groups,
   (B) a phenolic resin curing agent containing 30–100% by weight, based on total phenolic resin curing agent amount, of a phenolic resin curing agent represented by formula (II)

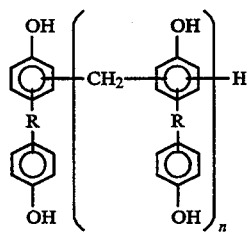

wherein R is paraxylylene group or a residual group obtained by removing two phenol portions from dicyclopentadiene diphenol or limonenediphenol, which is an addition product of limonene or dicyclopentadiene with phenol, and wherein n is an integer of 1 to 4, or a mixture of said agents wherein n is an integer of 0 to 4;
   (C) an inorganic filler in an amount of 70–90 wt % based on the total epoxy resin composition; and
   (D) a curing accelerator in an amount of 0.1–0.4 wt % based on the total epoxy resin composition,
   said epoxy resin (A) being used in an amount of 0.8 to 1.2 epoxy equivalents per hydroxyl group equivalent of said phenolic resin curing agent (B).

2. An epoxy resin composition according to claim 1, wherein $R_1$ to $R_4$ of the epoxy compound of formula (I) are each methyl group and $R_5$ to $R_8$ are each hydrogen atom.

3. An epoxy resin composition according to claim 1, wherein R of the phenolic resin curing agent of formula (II) is a residual group which is obtained by removing two hydrogen atoms from a terpene or dicyclopentadiene.

4. An epoxy resin composition according to claim 1, wherein the epoxy resin (A) contains the epoxy compound of formula (I) in an amount of 70–100% by weight based on total epoxy resin amount.

5. An epoxy resin composition according to claim 1, wherein the phenolic resin curing agent (B) contains the phenolic resin curing agent of formula (II) in an amount of 50–100% by weight based on total phenolic resin curing agent amount.

6. An epoxy resin composition according to claim 1, wherein the inorganic filler (C) is selected from the group consisting of fused silica powder, spherical silica powder and mixtures thereof.

7. An epoxy resin composition according to claim 1, wherein said phenolic resin curing agent comprises a mixture of compounds of formula (II).

* * * * *